United States Patent [19]

Farmwald et al.

[11] Patent Number: 5,111,464
[45] Date of Patent: May 5, 1992

[54] INTERRUPT REPORTING FOR SINGLE-BIT MEMORY ERRORS

[75] Inventors: Paul M. Farmwald, Berkeley; Timothy S. Fu, Fremont, both of Calif.

[73] Assignee: Mips Computer Systems, Inc., Sunnyvale, Calif.

[21] Appl. No.: 444,639

[22] Filed: Dec. 1, 1989

[51] Int. Cl.5 ............................................. G06F 11/10
[52] U.S. Cl. .................................. 371/40.1; 371/40.2
[58] Field of Search ..................... 371/40.1, 40.2, 13, 371/29.1

[56] References Cited

U.S. PATENT DOCUMENTS

| | | | |
|---|---|---|---|
| 4,209,846 | 6/1980 | Seppa | 364/900 |
| 4,255,808 | 3/1981 | Schaber | 371/38 |
| 4,360,917 | 11/1982 | Sindelar et al. | 371/49 |
| 4,375,664 | 3/1983 | Kim | 364/200 |
| 4,506,362 | 3/1985 | Morley | 371/13 |
| 4,535,455 | 8/1985 | Peterson | 371/13 |
| 4,964,129 | 10/1990 | Bowden, III et al. | 371/40.2 |

Primary Examiner—Jerry Smith
Assistant Examiner—Russell E. Cass
Attorney, Agent, or Firm—Townsend and Townsend

[57] ABSTRACT

Error reporting circuitry interrupts the CPU on the occurrence of a single bit memory error only when the chip member causing the error is different from the chip number that caused the previous error.

12 Claims, 4 Drawing Sheets

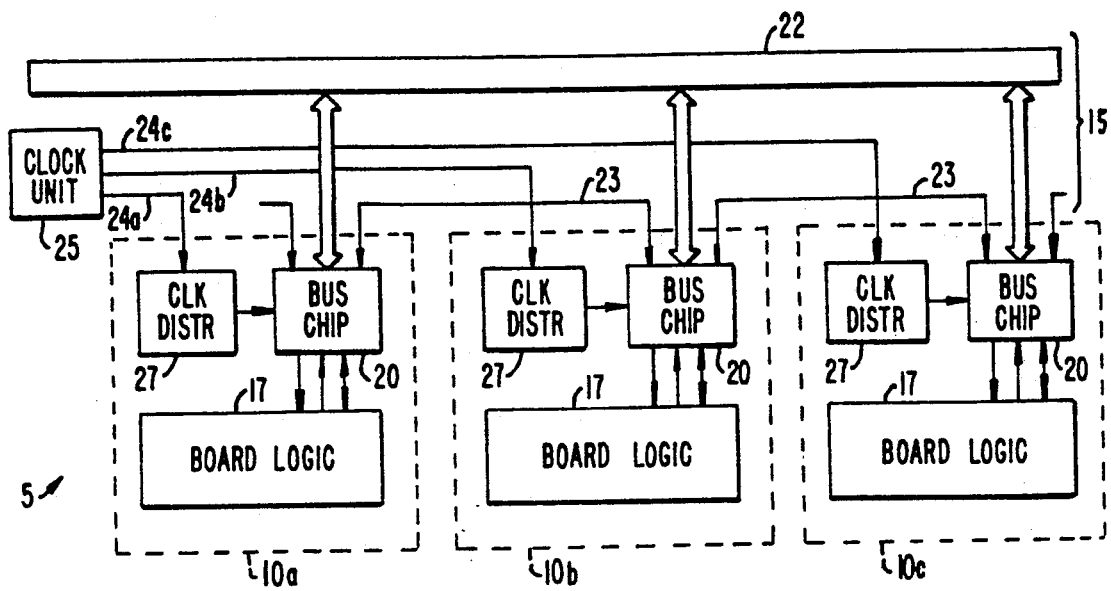
FIG._1A.
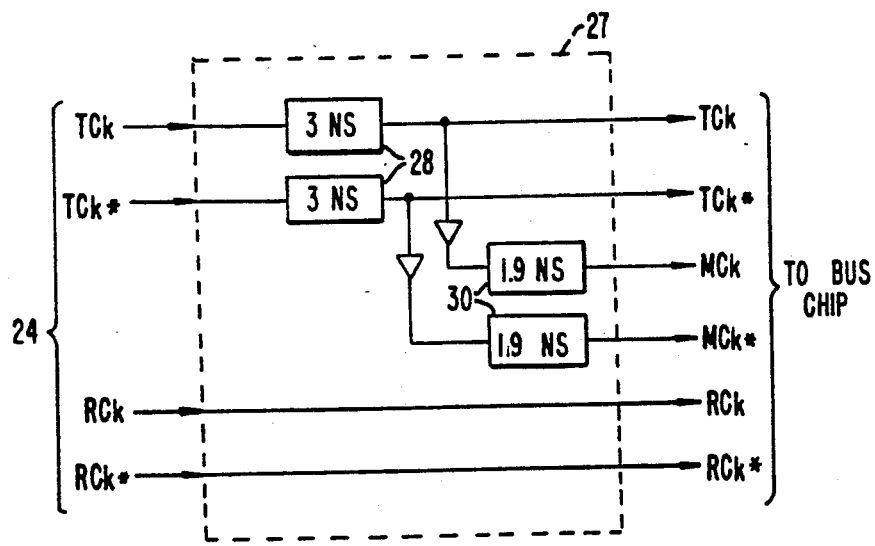
FIG._1B.

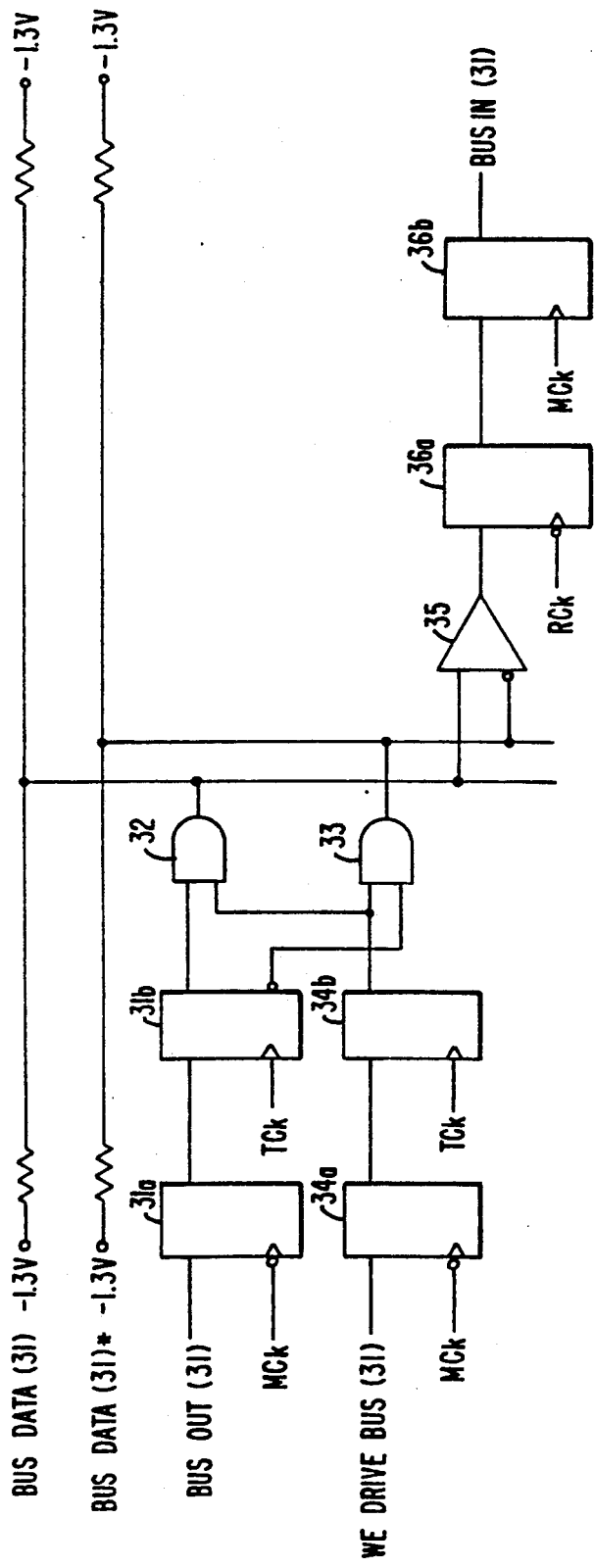
FIG._1C.
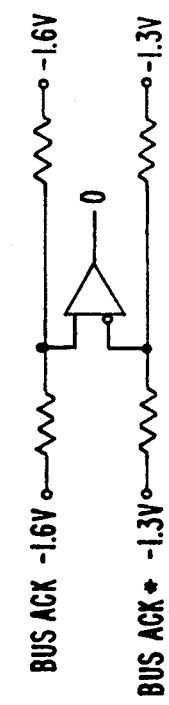
FIG._1D.

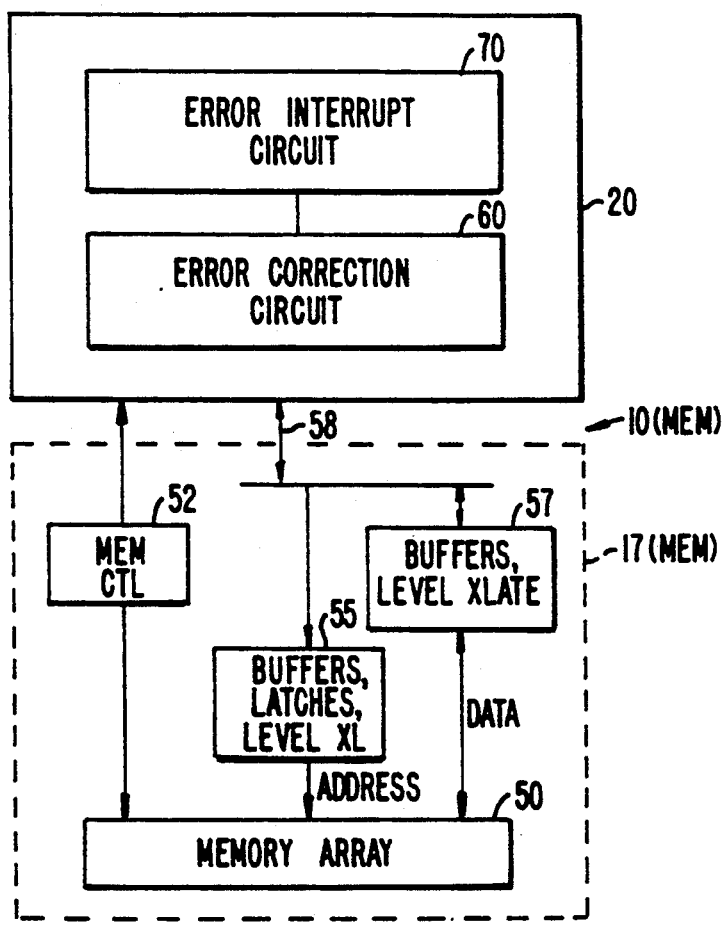
FIG._2.
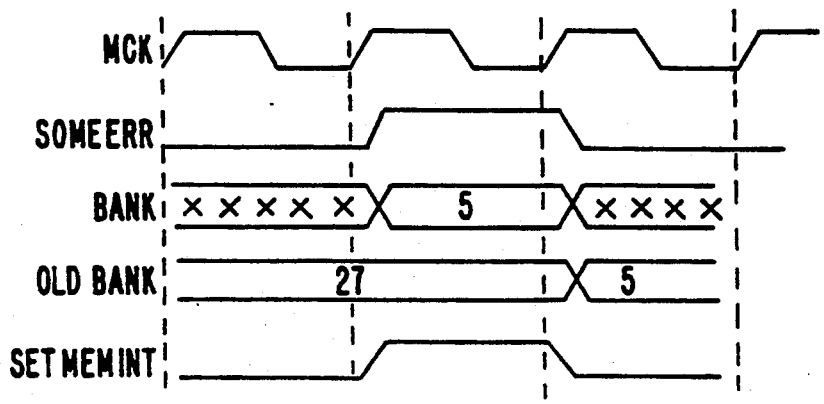
FIG._4.

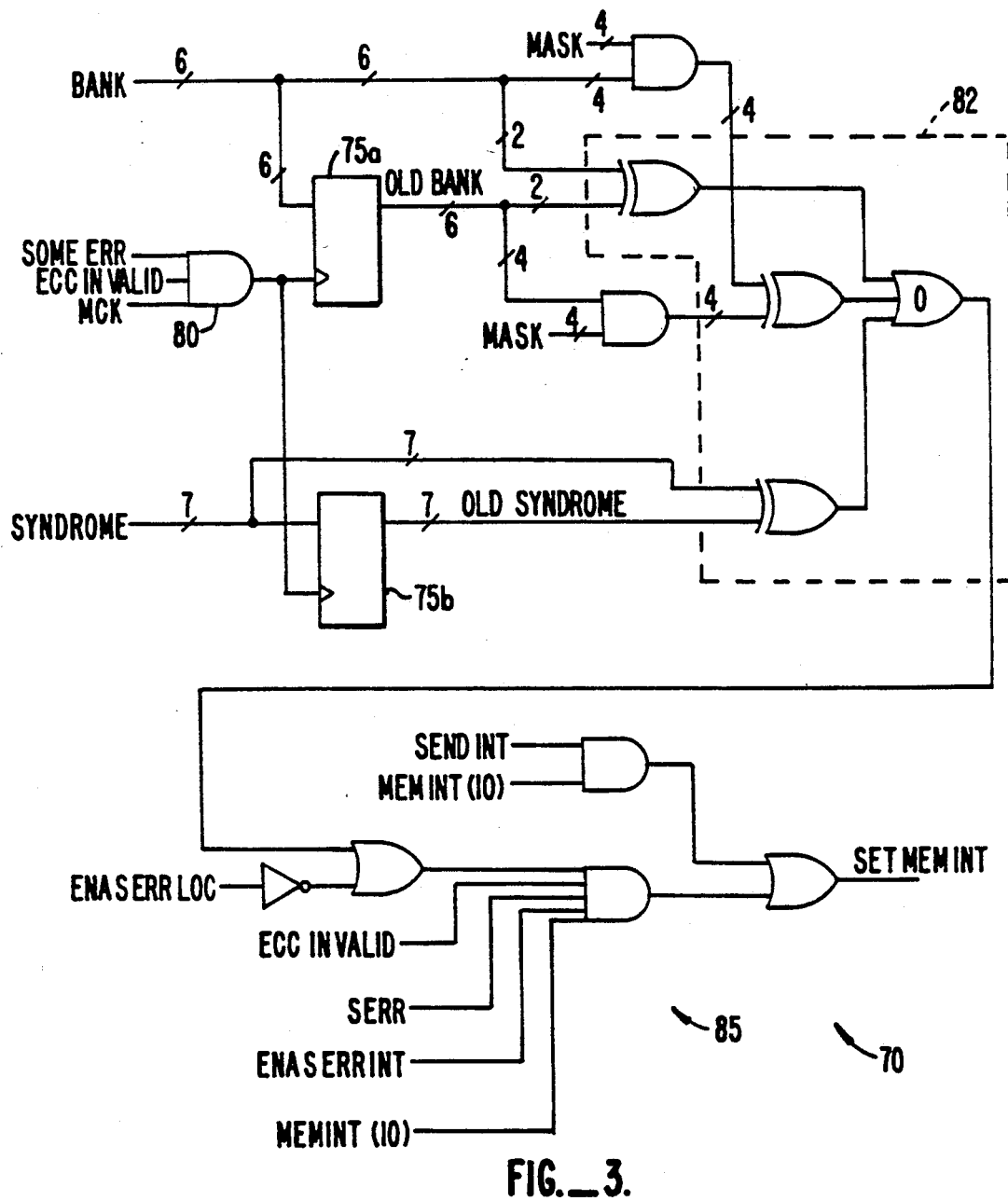
FIG._3.

INTERRUPT REPORTING FOR SINGLE-BIT MEMORY ERRORS

BACKGROUND OF THE INVENTION

The present invention relates to the correction and reporting of errors in computer memories.

A solid state computer memory is typically implemented as a relatively large array of memory chips. By way of numerical example, a 32-megabyte memory can be implemented using commercially available 1-megabit dynamic RAM (DRAM) chips. The DRAM chips are typically organized in a 1-Mbit by 1-bit configuration. In terms of 4-byte words, the memory could be organized as eight banks of 32 chips each.

It is known to provide each word with a check field for an error correction code (ECC). If each 32-bit word has associated with it a 7-bit ECC, it is possible to determine unambiguously whether a single bit of the 39 bits has an error, and which bit that is. Thus, single-bit errors are correctable. The ECC also contains enough information to specify that a 2-bit error has occurred, but not enough to correct such an error. Additionally, the ECC allows the detection of a 4-bit dropout, but cannot correct that.

Although it is possible to correct single-bit errors at the memory unit, it is desirable to have the operating system maintain records of which memory chips needed correction. One approach is to generate an interrupt each time an error is detected. This is a simple scheme, but it is cumbersome since a hard error on one chip would cause an interrupt at every access. As a practical matter, the operating system, when faced with the onslaught of interrupts, would typically turn off the interrupt entirely. An alternative approach provides an extra memory chip with one bit dedicated to each memory chip in the array. When a bit on one of the memory chips fails, the relevant entry in the table is set. The operating system can then determine the status by reading the table. This is a practical scheme, but adds an extra level of complication and expense.

SUMMARY OF THE INVENTION

The present invention is drawn to a practical technique for providing the operating system with relevant information regarding memory errors.

The present invention is implemented in a system where each word in memory is provided with a check field containing an error correction code (ECC). Suitable processing circuitry allows detection of a number of types of errors and the correction of single-bit errors. The processing circuitry provides error information, a portion of which makes it possible to identify the particular chip in which the error occurred.

According to one aspect of the invention, error interrupt circuitry compares a portion of the error information for a currently occurring error to the corresponding portion of the error information for the most recent previous error, and if they differ, sends an interrupt to the CPU and saves the corresponding portion of the current error information.

More specifically, the portion of the error information is communicated to the data input of a register, and is latched when an error has occurred. The old error information (previously stored in the register) and the new error information (about to be stored in the register) are compared, and an interrupt is generated only if the chip identifier has changed. In one embodiment, the register is latched upon the occurrence of any error (single-bit or multiple-bit), but an interrupt is generated only if the current error is a single-bit error. Latching the error and generating the interrupt occur only on cycles where data is being read out of the memory.

According to a further aspect of the invention, the error reporting circuitry is capable of operating in an alternative mode. More particularly, the CPU can override the circuitry that outputs interrupts only on new errors, and specify that interrupts be sent on all errors.

The present invention provides the operating system with the most relevant information. For example, soft errors (such as from alpha particle hits) are relatively infrequent and interrupting for such soft errors (which would normally occur on a different chip each time) does not represent a significant overhead. A hard error (a permanently failed bit or chip) causes a single interrupt to be sent (the first time the error is seen) but does not inundate the operating system with interrupts.

A further understanding of the nature and advantages of the present invention may be realized by reference to the remaining portions of the specification and the drawings.

BRIEF DESCRIPTION OF THE DRAWINGS

FIG. 1A is a high level block diagram of a computer system utilizing the memory error reporting technique of the present invention;

FIG. 1B is a block diagram showing the clock distribution to the bus chip;

FIG. 1C is a block diagram showing the bus drivers and bus receivers in the bus chip;

FIG. 1D shows a special termination scheme for selected bus lines;

FIG. 2 is a block diagram of a memory board;

FIG. 3 is a simplified circuit schematic of circuitry within the bus chip for reporting memory errors; and FIG. 4 is a timing diagram.

DESCRIPTION OF A REPRESENTATIVE EMBODIMENT

System and Bus Overview

FIG. 1A is an overall block diagram illustrating a computer system 5 in which a plurality of functional units 10 communicate with each other over a system bus 15. In a representative embodiment, there may be up to fifteen such units, implemented on circuit board connected to a backplane having traces defining the bus. Each functional unit includes a portion, referred to as board logic 17, which may be regarded as the functional unit proper. A bus interface portion, implemented as a single ECL VLSI chip, referred to as bus chip 20, interfaces the board logic to the bus. In the particular embodiment described herein, all bus control and data paths for any functional unit which connects to the bus are contained in bus chip 20.

For illustrative purposes, a system having three such units, designated 10a, 10b, and 10c will be described. In a typical system, at least one of the functional units is a CPU, at least one is an I/O processor, and at least one is a memory controller with associated memory.

System bus 15 includes a set of bi-directional differential signal lines 22, distributed in parallel to all the functional units, including:

BusData(31 ... 0)   system data bus

| | -continued |
|---|---|
| BusPar | support odd parity over BusData |
| BusType(2 ... 0) | identifier tag for BusData |
| BusAck | provide acknowledgment mechanism |

Table 1 shows the encoding for BusType.

In addition, the backplane includes a set of traces 23, which connect the units in a daisy chain manner for slot determination, and sets 24a-c of clock lines, radially distributed to units 10a-c from a clock unit 25. Lines 24 communicate to a clock distribution network 27 on each unit.

FIG. 1B is a block diagram of clock distribution network 27. Clock lines 24 include signals designated TCk and RCk (and their logical complements TCk* and RCk*), which are distributed with constant delay traces on the backplane to all units. TCk and RCk are 12.5-ns, 50% duty cycle clocks. RCk is delayed relative to TCk by 5 ns at the point where they arrive at clock distribution network 27. RCk and RCk* are communicated to bus chip 20 without further delay. TCk and TCk* are delayed by 3-ns delay lines 28 before reaching bus chip 20. The delayed versions of TCk and TCk* are also buffered and delayed by 1.9-ns delay lines 30 to define a complementary pair of signals MCk and MCk*. The maximum skew between different TCk and RCk signals (at the bus chip) is ±0.5 ns.

The delay of RCk relative to TCk allows the data on the bus to be partially overlapped, i.e., to take more than a 12.5-ns cycle to propagate from driver to receiver. All bus drivers use TCk to clock output signals and all bus receivers use RCk to clock the input registers for data from the bus.

FIG. 1C is a block diagram showing the circuitry for driving and receiving signals on one of signal lines 22, say BusData(31). The bus is a differential bus and includes a complementary line pair, in this case, BusData(31) and BusData(31)*. With two exceptions set forth below, the bus lines in each pair are terminated at −1.3 volts.

An internal signal WeDriveBus(31) specifies that bus pair no. 31 will be driven with the value defined by another internal signal BusOut(31). BusOut(31) drives a first master-slave flip-flop defined by latches 31a and 31b, the complementary outputs of which are communicated to respective first inputs of AND gates 32 and 33. WeDriveBus(31) drives a second masterslave flip-flop defined by latches 34a and 34b, the output of which drives both second inputs of the AND gates 32 and 33. The outputs of AND gates 32 and 33, which are guaranteed to be complementary, are coupled to BusData(31) and BusData(31)*. A true value at one of the AND gate outputs drives a signal of about 0.7 volts on the line to which is connected, while a false value results in no drive. Latches 31a and 34a are clocked by the falling edge of MCk while latches 31b and 34b are clocked by the rising edge of TCk. Each latch is characterized in that it holds the value when its clock input is low, and becomes transparent when its clock input is high.

Signals in from the bus are communicated to the respective inputs of a differential receiver 35 and to a master slave flip-flop defined by latches 36a and 36b. Latch 36a is clocked by the falling edge of RCk and latch 36b is clocked by the rising edge of MCk. The output of latch 36b is a signal BusIn(31) that is communicated to other portions of the bus chip.

FIG. 1D shows a special termination scheme for certain of the bus line pairs, namely those for BusType(2..0) and BusAck. As noted above, most of the bus pairs have both lines terminated at −1.3 volts, so that when no unit drives them, the bus value is undefined.

However, it is important that the pairs for BusType(2..0) and BusAck provide a defined value, even if no unit drives them. To provide default values, one line in each pair is terminated at −1.6 volts. More particularly, BusType(2)*, BusType(1), BusType(0), and BusAck are terminated at −1.6 volts, so that BusType and BusAck assume default values of 100 and 0, respectively.

Memory Error Reporting

FIG. 2 is a block diagram of a functional unit, specifically a memory board 10(mem). The board logic, designated 17(mem), includes a memory array 50, a memory controller 52, address buffers, latches, level translators 55, and data buffers and level translators 57. The need for level translators arises from the fact that memory array 50 comprises dynamic RAM (DRAM) chips which operate at TTL levels, while bus chip 20 is implemented in ECL. Communication of addresses and data between board logic 17(mem) and bus chip 20 occurs via an internal data bus 58.

In the preferred embodiment, a data word (as appears on system bus 15) is 32 bits wide, while the word written into memory is provided with an associated 7-bit error correction code (ECC), and thus is actually 39 bits wide. In accordance with known practice, memory array 50 is organized as a number of banks, each comprising 39 1-Mbit×1 bit DRAM chips.

Bus chip 20 includes error correction circuitry 60 which is responsible for computing the seven ECC bits on the basis of the data being written into memory and for analyzing the 39 bits read out of memory to determine whether an error has occurred. As mentioned above, the bus chip corrects single bit-errors and detects double-bit errors. The bus chip also includes error interrupt circuitry 70 according to the present invention.

Error correction circuitry 60 and error interrupt circuitry 70 make use of a pair of registers called MemECC and MemCtl, which control the usage of error correction and detection bits. The fields making up these registers are set forth in Table 2. As can be seen from the table, certain of the register fields can only be read from outside the bus chip while others can be written into from outside the bus chip.

ECCSaved(6..0) in MemECC holds the ECC bits from the last read operation. Normally the ECC bits that are written to memory are computed from the data being written. If EnaECCInSel in MemCtl is set, the ECC written will be taken from the register ECCReg(6..0) in MemECC, which is provided for diagnostic purposes. Only single word read and write operations are implemented in this mode, which allows memory tests on all 39 bits.

MemCtl contains two error flags, SBitErr which is asserted when a single-bit error is detected, and MBitErr which is asserted when a double-bit error is detected and EnaMErr is set. Once asserted, SBitErr and MBitErr remain asserted until a word write operation is performed to MemCtl, at which time they are negated.

A representation of the memory chip where the last single-bit error occurred is stored as a 6-bit OldBank field and a 7-bit OldSyndrome field. OldBank(5..0) holds the interleaved bank number of the word physical address for the last reference that caused a single-bit error. It is formed by the concatenation of SlaveAdr(27..26) and SlaveAdr(5..2) which are physical address bits. This allows interleaving (inside a memory card) of up to 16-word (not counting nibble-mode or page-mode) interleaving within a RAM chip. BankMask(3..0) encodes information about the interleaving scheme for a given memory board. For a 32-MByte memory card, using 8-way interleaving on the three low-order bits, the correct binary value for BankMask is 0001.

OldSyndrome(6..0) holds the syndrome, as encoded by error correction circuit 60. Certain of the possible values for the syndrome specify the bit position (chip number) within the 39-bit memory word that was in error and that was corrected. Table 3 is a table allowing a translation of syndrome to bit position. The table is laid out with the most significant hexadecimal digit of the syndrome value being the row identifier and the least significant hexadecimal digit being the column identifier. For example, syndrome=00 means no error; syndrome=01 means that bit 0 of the 7-bit ECC field was the bit in error; syndrome=0D means that bit 25 in the 32-bit data field was the bit in error; and syndrome=52 means that bit 19 of the data field was in error. Entries marked with an × signify a multiple-bit error.

MemInt(10..0) and EnaSErrInt in MemCtl controls the interrupt capability of error interrupt circuitry 70. The occurrence of single-bit memory errors and/or the assertion of the input signal BrdSendInt can generate an interrupt to a selectable slot and vector. The interrupt consists of a bus word write operation with a single bit set (bit number is MemIntBit(1..0)) to the IntVecSet register in the bus chip located on the board residing in slot MemIntSlot(7..0). If the MemIntEna and EnaSErrInt bits are asserted, and a single-bit memory error is detected, the circuitry will initiate an interrupt. An interrupt will also be initiated if the MemIntEna bit is asserted, and the SendInt signal is asserted.

Error interrupt circuitry 70 is concerned with reporting single-bit errors, and determines whether all such errors result in interrupts or not. Multiple-bit errors must always be reported, and a separate mechanism, not part of the invention and not described here, sets the bustype field to a value 4 signifying bad data. The CPU's bus chip, on seeing bustype=4, asserts BrdBusErr which the CPU must take very seriously.

When a new error is seen, OldBank and OldSyndrome are updated from the incoming Bank and Syndrome, and the contents of MemInt(10..0) are used to specify the interrupt. The processor interrupted is responsible for looking at OldBank(5..0) and OldSyndrome (6..0) and updating the OS data structure with the information about failing memory chips. The processor should also determine whether the error is hard or soft (by executing a small memory test) and possibly request that the memory board be removed for service.

Error correction circuitry 60 provides signals SomeErr, SErr, and ECCInValid. SomeErr is asserted if an error of some sort has occurred (single-bit or another type of error). SErr is asserted if a single-bit error has occurred. ECCInValid is asserted if the ECC is enabled, if the board is a memory board, and if the signals being received by the bus chip on the data lines from the board logic are flagged as data. Put another way, ECCInValid is asserted on data read cycles from memory when error correction is in effect.

FIG. 3 is a simplified schematic of error interrupt circuitry 70. The simplified schematic is drawn assuming that logical true values are high. The incoming 6-bit bank number and the 7-bit syndrome are communicated to the data inputs of a 6-bit flip-flop 75a and a 7-bit flip-flop 75b. The flip-flops are clocked by system clock signal MCk, as validated by the assertion of the SomeErr and EccInValid signals. This is shown schematically as a 3-input AND gate 80 connected to the clock input.

The multi-bit outputs of flip-flops 75a and 75b (reflecting stored bank and syndrome values) are communicated to a first multi-bit input of a 13-bit comparator 82. The multi-bit data inputs to flip-flops 75a and 75b (reflecting current bank and syndrome values) are communicated to a second multi-bit input of comparator 82. The high order bank information is ANDed with the 4-bit mask before input to the comparators. The comparator is implemented as exclusive OR gates and wired OR's, and provides a logical true if any bit in the bank or syndrome has changed.

The signal from comparator 82 is communicated to a gate network 85 that controls the assertion of a signal called SetMemInt. When SetMemInt is asserted, interrupt information is sent on the bus to a register in the CPU's bus chip, which causes an interrupt to the CPU. Gate network 85 is controlled by a number of signals that determine whether a true comparator output causes an interrupt. MemIntEna (MemInt(10)) is necessary, and when asserted renders SendInt sufficient. Assuming SendInt is not asserted, ECCInValid, SErr, and EnaSErrInt are all necessary. Assuming these three are asserted, SetMemInt will be asserted if the comparator output is true (a new error) or if EnaSErrLoc is false. Thus, EnaSErrLoc, when asserted, allows interrupts on new single-bit errors only, and when withdrawn, allows all single-bit errors to cause interrupts. EnaSErrLoc is controlled by the processor receiving the interrupt, and allows the processor to listen to all interrupts if it wants to, such as during a period immediately following a new error. EnaSErrLoc thus operates as a mode switch, selecting between interrupts on new single-bit errors only or interrupts on all single-bit errors.

FIG. 4 is a timing diagram illustrating the signals that are asserted under a representative set of circumstances when the error location changes. Assume that the bank number stored in flip-flop 75a (OldBank) is 27, and that a new error is occurring in Bank 5. OldBank was set to 27 and remains so in the absence of a validated clock signal at the flip-flop clock input. It should be noted that the incoming value of Bank may or may not be relevant on many cycles, but is presented at the flip-flop input and is transmitted to the comparator and other circuitry. On the first cycle where SomeErr and EccInValid are asserted, the bank value of 5 is presented at the flip-flop input, and on the next following clock transition, is latched into the flip-flop so that OldBank (which was previously 27) is overwritten by the incoming bank number 5. During the cycle that EccInValid and SomeErr are asserted, assuming that the error is a single-bit error (SErr asserted), the SetMemInt signal is asserted.

Conclusion

In conclusion, it can be seen that the present invention provides a mechanism for keeping track of errors and reporting single-bit errors only when the chip number (bank +syndrome) for such single-bit error is different from the previously stored chip number that caused an error. Yet, the system retains the flexibility that allows a CPU to receive interrupts on all single-bit errors, if appropriate.

While the above is a complete description of the preferred embodiments of the invention, various alternatives, modifications, and equivalents may be used. Therefore, the above description should not be taken as limiting the scope of the invention which is defined by the appended claims.

TABLE 1

BusType Encoding

| BusType (2...0) | Master to Slave (Interpretation) | Slave to Master |
|---|---|---|
| 000 | NoData | NoData |
| 001 | Command | SlvErr1 |
| 010 | Data | Data |
| 011 | Data+Switch | Data+Switch |
| 100 | BadData | SlvErr2 |
| 101 | Command | SlvErr3 |
| 110 | Data+WriteDisabled | Data |
| 111 | Data+WriteDisabled+Switch | Data+Switch |

TABLE 2

| Bits | Type | Name | Function |
|---|---|---|---|
| MemECC Register Bit Assignments | | | |
| (31...25) | R | ECCSaved(6...0) | Saved ECC |
| (24...19) | R | OldBank(5...0) | Previous bank |
| (18...12) | R | OldSyndrome(6...0) | Previous syndrome |
| (11) | R/W | Reserved | |
| (10...7) | R/W | BankMask(3...0) | Bank mask |
| (6...0) | R/W | ECCReg(6...0) | ECC write register |
| MemCtl Register Bit Assignments | | | |
| (31) | R | SBitErr | Single bit error |
| (30) | R | MBitErr | Multiple bit error |
| (29...26) | R/W | Reserved | |
| (25...16) | R | RefreshCtr(10...0) | Refresh counter |
| (15...5) | | MemInt(10...0) | Memory interrupt control |
| (15) | R/W | MemIntEna | Memory interrupt enable |
| (14...7) | R/W | MemIntSlot(7...0) | Memory interrupt slot |
| (6...5) | R/W | MemIntBit(1...0) | Memory interrupt bit |
| (4) | R/W | EnaECCInSel | Enable ECC in select |
| (3) | R/W | EnaSErrLoc | Enable single error loc. |
| (2) | R/W | EnaSErrCorrect | Enable single error corr. |
| (1) | R/W | EnaSErrInt | Enable single error int. |
| (0) | R/W | EnaMErr | Enable multiple error det. |

TABLE 3

Syndrome to Bit-in-Error (Ex is ECC(x). Dy is Data(y))

| Syndrome | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0_ | no | E0 | E1 | x | E2 | x | x | x | E3 | x | x | x | x | D25 | D28 | x |
| 1_ | E4 | x | x | D17 | x | D23 | D20 | x | x | D27 | D16 | x | D26 | x | x | x |
| 2_ | E5 | x | x | D8 | x | D9 | D12 | x | x | D10 | D13 | x | D15 | x | x | x |
| 3_ | x | D11 | D18 | x | D21 | x | x | x | D29 | x | x | x | x | x | x | x |
| 4_ | E6 | x | x | D0 | x | D1 | D5 | x | x | D31 | D6 | x | D2 | x | x | x |
| 5_ | x | D3 | D19 | x | D22 | x | x | x | D30 | x | x | x | x | x | x | x |
| 6_ | x | D4 | D14 | x | D7 | x | x | x | D24 | x | x | x | x | x | x | x |
| 7_ | x | x | x | x | x | x | x | x | x | x | x | x | x | x | x | x |

What is claimed is:

1. Apparatus for use in a computer system which operates to provide error information including an indication that a memory error has occurred and, at least for some memory errors, an identifier of the portion of memory where the error occurred, comprising:
   register means for storing at least a portion of the error information for the most recent previous error;
   comparison means, responsive to the stored error information and to incoming error information, for providing an indication whether they differ;
   means, responsive to the occurrence of an error, for transferring the corresponding portion of the incoming error information into said register means; and
   means for generating an interrupt signal, operable in at least one mode to generate an interrupt signal only if said comparison means indicates a difference and at least one type of error has occurred.

2. The apparatus of claim 1 wherein said means for generating an interrupt signal is effective only for single-bit errors.

3. The apparatus of claim 1 wherein said means for transferring is effective for single-bit errors and at least one other type of error.

4. The apparatus of claim 1 wherein:
   the memory comprises memory chips and is organized in banks that are one chip high by N chips wide where N is the number of bits in a word;
   the error information includes a first error signal specifying that a single-bit error has occurred, a second error signal specifying that some error has occurred, a bank number field, and a syndrome field where at least some values of the syndrome specify that a single-bit error occurred and identify the chip number in the bank where the single-bit error occurred.

5. The apparatus of claim 1 wherein said means for generating an interrupt is operable in at least one additional mode to generate an interrupt signal whenever said at least one type of error has occurred, regardless of the indication from said comparison means.

6. The apparatus of claim 1 wherein said means for comparing comprises a plurality of exclusive OR gates.

7. The apparatus of claim 1 wherein:
said means for generating an interrupt signal is effective only for single-bit errors;
said means for transferring is effective for single-bit errors and at least one other type of error; and
said means for generating an interrupt is operable in at least one additional mode to generate an interrupt signal whenever a single-bit error has occurred, regardless of the indication from said comparison means.

8. Apparatus for use in a computer system which operates to provide error information, including a first error signal specifying that a single-bit error has occurred, a second error signal specifying that some error has occurred, a bank number field that specifies a region in memory where an error has occurred, a syndrome field where at least some values of the syndrome specify that a single-bit error has occurred in a particular sub-region of memory, comprising:
register means having a data input and a clock input for storing a bank and syndrome provided at the time of the most recent previous error;
means for applying the incoming bank and syndrome to said data input of said register means;
comparison means for providing an indication whether the stored bank and syndrome differ from the incoming bank and syndrome;
means, responsive to the second error signal, for providing a clock signal at said clock input of said register means for transferring the incoming bank and syndrome into said register means; and
means for generating an interrupt signal, operable in at least one mode to generate an interrupt signal only if said comparison means indicates a difference and the first error signal is asserted.

9. The apparatus of claim 8 wherein said means for generating an interrupt is operable in at least one additional mode to generate an interrupt signal whenever said first error signal is asserted, regardless of the indication from said comparison means.

10. A method for use in a computer system which operates to provide error information including an indication that a memory error has occurred and, at least for some memory errors, an identifier of the portion of memory where the error occurred, comprising the steps of:
storing at least a portion of the error information corresponding to the most recent previous error;
comparing the stored error information and incoming error information, and providing an indication whether they differ; and
generating, in at least one mode, an interrupt signal only if said comparing step indicates a difference and at least one type of error has occurred.

11. The method of claim 10 wherein said generating step is performed only for single-bit errors.

12. The method of claim 10, and further comprising the step of generating, in at least one additional mode, an interrupt signal whenever said at least one type of error has occurred, regardless of the indication from said comparison means.

* * * * *